United States Patent
Huysmans et al.

(10) Patent No.: US 10,709,640 B2
(45) Date of Patent: *Jul. 14, 2020

(54) TAMPERPROOF ORAL DOSAGE FORM

(71) Applicant: Capsugel Belgium NV, Bornem (BE)

(72) Inventors: Tom Huysmans, Sint-Niklaas (BE); Tarryn Dierckx, Deurne (BE); Stefaan Jaak Vanquickenborne, Rijmenam (BE)

(73) Assignee: Capsugel Belgium NV, Bornem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/769,381

(22) PCT Filed: Aug. 8, 2016

(86) PCT No.: PCT/EP2016/068842
§ 371 (c)(1),
(2) Date: Apr. 19, 2018

(87) PCT Pub. No.: WO2017/084778
PCT Pub. Date: May 26, 2017

(65) Prior Publication Data
US 2018/0303716 A1    Oct. 25, 2018

(30) Foreign Application Priority Data
Nov. 16, 2015  (EP) .................................. 15194821

(51) Int. Cl.
*A61J 3/07*  (2006.01)
*C09J 103/02*  (2006.01)
(Continued)

(52) U.S. Cl.
CPC ................. *A61J 3/072* (2013.01); *C09J 5/00* (2013.01); *C09J 103/02* (2013.01); *C09J 105/00* (2013.01);
(Continued)

(58) Field of Classification Search
CPC ........ A61J 3/072; C09J 103/02; C09J 105/00; C09J 5/00; C09J 2405/00; C09J 2403/00
See application file for complete search history.

(56) References Cited

U.S. PATENT DOCUMENTS

| 3,702,653 | A |   | 11/1972 | Mottin et al. |
| 4,539,060 | A | * | 9/1985 | Wittwer ................. A61J 3/072 156/275.1 |

(Continued)

FOREIGN PATENT DOCUMENTS

| EP | 0797424 | 7/2000 |
| EP | 3167870 | 5/2017 |

(Continued)

OTHER PUBLICATIONS

Extended Search Report for European Patent Application No. 15194821.3 (dated Sep. 19, 2016).
(Continued)

*Primary Examiner* — Trevor Love
(74) *Attorney, Agent, or Firm* — Klarquist Sparkman, LLP

(57) ABSTRACT

A tamperproof dosage form article comprising: a core, wherein the core comprises a first end and a second end; a first shell on at least a portion of the first end of the core; a second shell on at least a portion of the second end of the core; wherein the first and second shells comprise one or more locking protrusions extending along at least a portion of the circumference and inner surface of the shells, and the core comprises one or more locking recesses, and wherein at least a portion of the shells proximal to the locking protrusions is elastically deformable and arranged such that each one locking protrusion is snapped into each one of the (Continued)

locking recesses once inserted over a predetermined portion of the core to provide a locking force between the core and the shells.

20 Claims, 6 Drawing Sheets

(51) Int. Cl.
  *C09J 105/00* (2006.01)
  *C09J 5/00* (2006.01)
(52) U.S. Cl.
  CPC ........ *C09J 2403/00* (2013.01); *C09J 2405/00* (2013.01)

(56) References Cited

U.S. PATENT DOCUMENTS

| | | | |
|---|---|---|---|
| 4,928,840 A | | 5/1990 | Barshay et al. |
| 5,234,099 A | | 8/1993 | Berta |
| 6,126,767 A | | 10/2000 | Smith et al. |
| 2004/0253312 A1* | | 12/2004 | Sowden .................. A23G 3/04 424/473 |
| 2006/0286049 A1 | | 12/2006 | Grethen-Pourille et al. |
| 2007/0184077 A1* | | 8/2007 | Vanquickenborne ... A61J 3/072 424/400 |
| 2008/0102116 A1* | | 5/2008 | Perry .................. A61K 9/0007 424/465 |
| 2009/0099265 A1 | | 4/2009 | Van As |
| 2012/0045510 A1 | | 2/2012 | Waldman |
| 2014/0348912 A1* | | 11/2014 | Singh .................. A61K 9/4808 424/456 |
| 2016/0051479 A1 | | 2/2016 | Rinker et al. |

FOREIGN PATENT DOCUMENTS

| | | |
|---|---|---|
| JP | 2018535706 | 12/2018 |
| WO | WO2005/039474 | 5/2005 |
| WO | WO2009/050190 | 4/2009 |
| WO | WO2014/181200 | 11/2014 |

OTHER PUBLICATIONS

International Search Report and Written Opinion for PCT/EP2016/068842 (dated Dec. 19, 2016).

* cited by examiner

TAMPERPROOF ORAL DOSAGE FORM

CROSS REFERENCE TO RELATED APPLICATIONS

This is the U.S. National Stage of International Application No. PCT/EP2016/068842, filed Aug. 8. 2016, which was published in English under PCT Article 21(2), which in turn claims the benefit of European Patent Application No. 15194821.3, filed Nov. 16, 2015, which is incorporated herein in its entirety.

FIELD

The present disclosure relates to tamperproof ingestible dosage form articles suitable for the delivery of one or more medicaments or other active materials. More particularly, the dosage form articles are suitable for ingestion by a subject, preferably the subject being selected from humans or animals.

BACKGROUND

Capsule technology continues to be subject to development and improvements. In particular, over the last decades, a need for providing better tamperproofness to dosage forms has resulted in technological developments that provide some tamper resistance to such dosage forms.

For example, EP0797424B1, discloses manners by which hard capsule shells can be shrink-wrapped onto tablets to provide tightly fitted shells over the tablet. Although providing some resistance to removal of the shells, a need still exists to further improve such dosage forms to provide a truly tamper resistant product.

Other examples, like U.S. Pat. No. 6,126,767, describe manners by which shrink-wrapping of shells over tablets is combined with banding via a gelatin band or application of a gelatin dot at the apexes of the tablet over the land thereof. However, such methods result in dosage forms that have limited applications, not enabling their use in different target/controlled-release applications (whereby, for example, the use of polymeric shells are rather desirable such as pullulan, celluloses like HPMC, enteric polymers like HPMCAS, HPMCP, CAP and the like), as well as particularly suffering from tampering upon twisting of the shells (i.e. under torsion).

Other examples, such as U.S. Pat. No. 5,234,099, describe coating of tablets by dipping into a gelatinous composition to provide tamperproofness. Such methods however prove costly and may bring along with it inherent contamination issues. Moreover, such process provides some limitation as to the compositional characteristics of the gelatinous coatings that can be successfully used.

A need therefore exists for truly tamperproof dosage forms that overcome the problems of the prior art and particularly allows to simplify the process of making tamperproof dosage forms.

SUMMARY

In a first aspect of the disclosure, a tamperproof dosage form article comprising: a core, wherein the core comprises a first end and a second end; a first shell on at least a portion of the first end of the core; a second shell on at least a portion of the second end of the core; wherein the first and second shells comprise one or more locking protrusions extending along at least a portion of the circumference and inner surface of the shells, and the core comprises one or more locking recesses, and wherein at least a portion of the shells proximal to the locking protrusions is elastically deformable and arranged such that each one locking protrusion is snapped into each one of the locking recesses once inserted over a predetermined portion of the core to provide a locking force between the core and the shells.

In a second aspect, a process of making tamperproof dosage forms.

DETAILED DESCRIPTION

Figure 1:
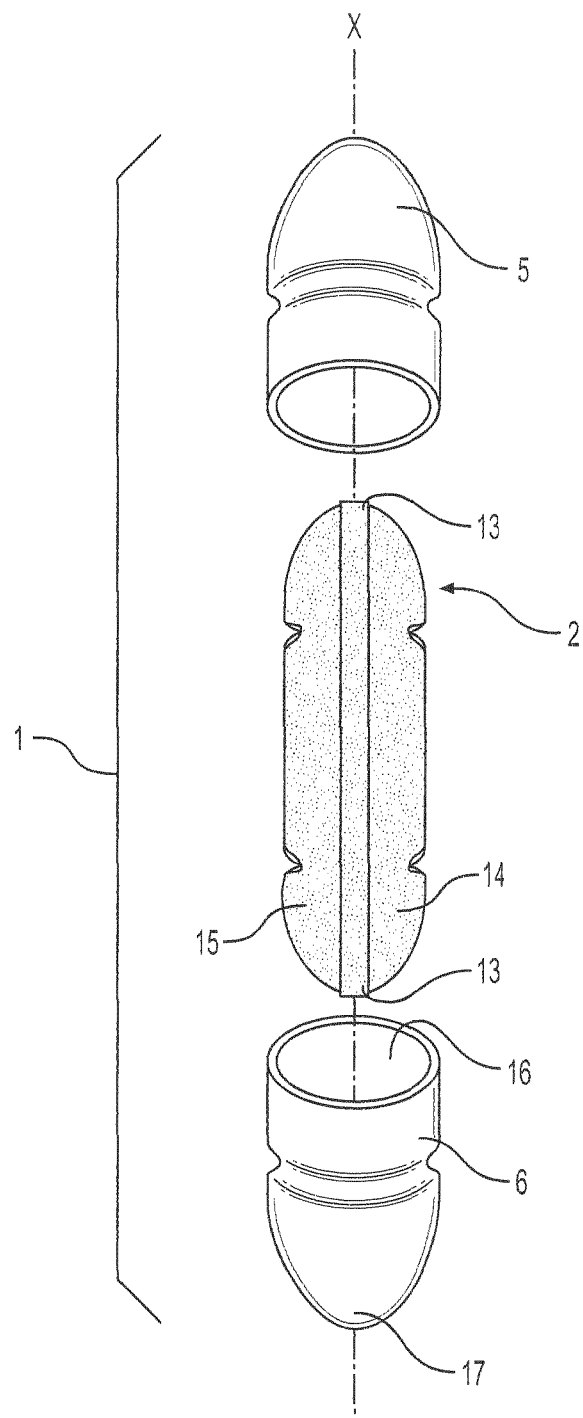
FIG. 1 is an illustration of an exploded view of a dosage form article according to one aspect of the disclosure.
Figure 2:
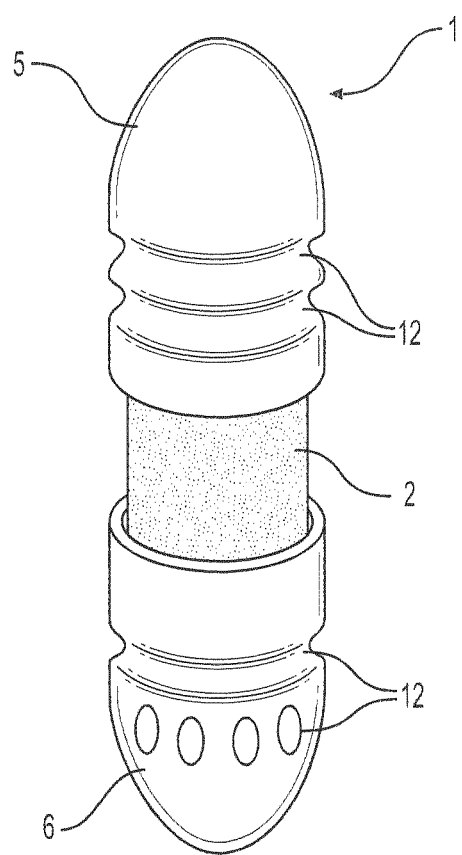
FIG. 2 is an illustration of a dosage form article according to one aspect of the disclosure.
Figure 3:
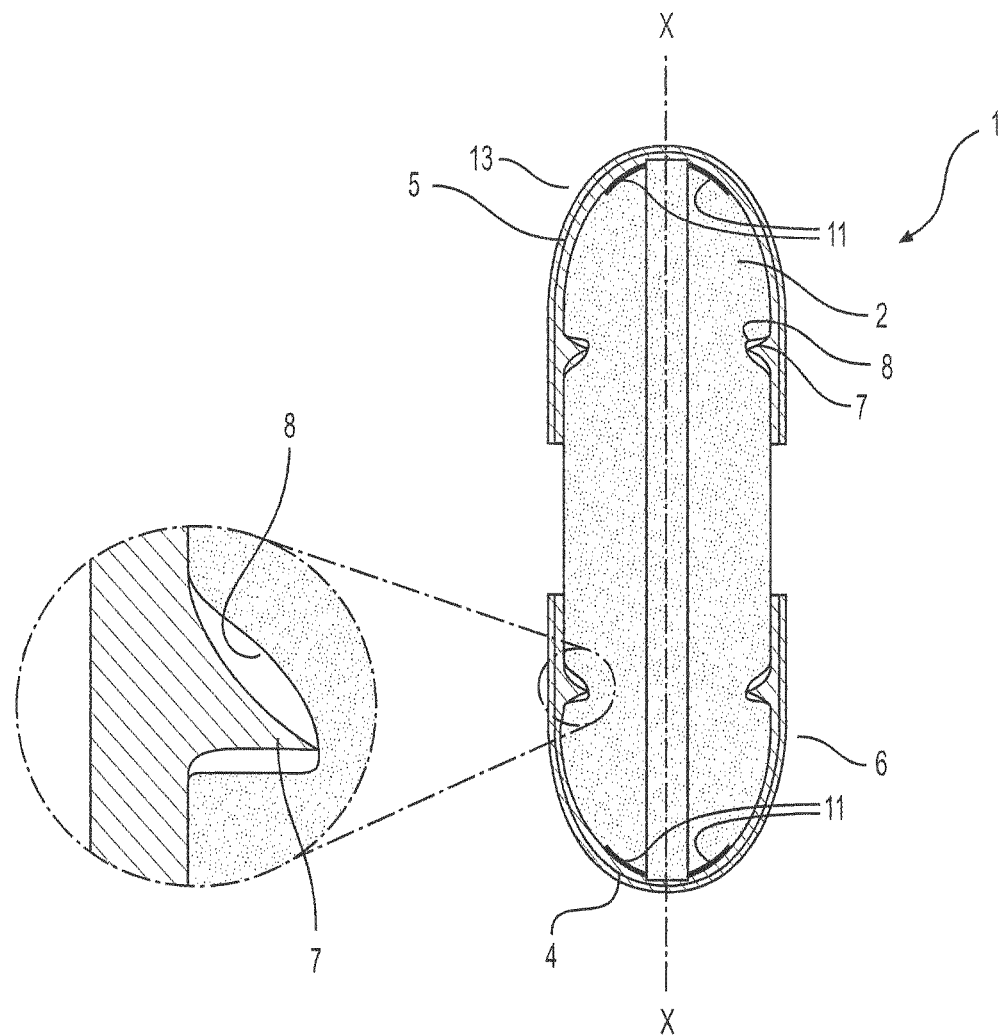
FIG. 3 is a side cross section view of a dosage form article according to one aspect of the disclosure, over the longitudinal axis X.
Figure 4:
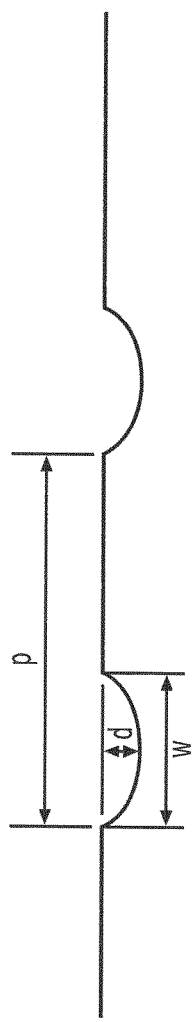
FIG. 4 is an illustration of the dimensions of external recesses according to an aspect of the disclosure.

By the term "a" and/or "an" when describing a particular element, it is intended "at least one" of that particular element.

By the term "medicament", it is intended a "drug" or the like comprising one or more compounds providing one or more curative benefits to a subject, the terms "medicament" and "drug" may be used interchangeably herein.

By the term "hard shell" or "hard capsule shell", it is intended a shell that is deformable, but which returns to its un-deformed shape upon the removal of a deforming force.

Typically such shells comprise less than 25%, preferably less than 20%, more preferably from 0% to 14%, even more preferably from greater than 0% to less than 14%, water by weight.

By the term "free of organic solvent", it is intended that the level of organic solvent does not exceed 2%, preferably 1.5%, more preferably 1%, even more preferably 0.5%, even more preferably 0.2%, most preferably about 0%, by weight of the item referred to (e.g. by weight of the composition).

By the term "tamperproof" or "tamperproofness", it is intended that the opening force to separate the capsule shells from the caplet is greater or equal to the fracture strength (also commonly referred to as breaking strength or shear strength) of the caplet and/or capsule shells. Generally, the fracture strength of a dosage form may be determined by graphical analysis of a stress-strain curve following a tensile test. Typically, such opening force is greater than 15N, preferably greater than 20N, more preferably greater than 40N, more preferably from 60N to 100N, according to the method described herein. Additionally or alternatively, such opening force may also convert to a torsion force that is greater than 100 Nmm, preferably greater than 120 Nmm, more preferably from 130 Nmm to 550 Nmm.

By the term "land or tablet/caplet/core land", it is intended the portion of the tablet (also referred to as caplet or core) that is interposed between two opposite and substantially curved faces (also referred to as top and bottom faces or surfaces) thereof. Generally the land comprises a substantially flat surface that circumscribes a perimeter of the tablet along a plane parallel to the length of the tablet and is typically a result of tablet manufacture by common tableting tools by compression. The land is also generally referred to in the art as a narrow, horizontal surface perpendicular to the tablet's periphery, which creates a junction between the tablet's periphery and the cup (also referred to a top and/or bottom face/surface of the tablet).

By the term "adhesive substance or adhesive", it is intended a substance capable of fastening two objects (or two distinct surfaces) together by molecular bonding. For example, an adhesive substance as used herein is a substance that fastens the first and/or second shells to a caplet without the need of further manipulation (such as shrinking of the shells) to attain such fastening or adhesion.

Various embodiments will now be described to provide an overall understanding of the principles of the structure, function, manufacture, and use of dosage form articles and methods disclosed herein. One or more examples of these embodiments are illustrated in the accompanying figures. Those of ordinary skill in the art will immediately understand that features described or illustrated in connection with one example embodiment can be combined with the features of other example embodiments without generalization from the present disclosure.

Dosage Form Articles

In an aspect of the disclosure, the tamperproof dosage forms 1 herein comprise: a core 2, wherein said core 2 comprises a first end 3 and a second end 4; a first shell 5 on at least a portion of the first end 3 of the core 2; a second shell 6 on at least a portion of the second end 4 of the core 2; wherein the first and second shells 5,6 comprise one or more locking protrusion(s) 7 and/or recess(es) (not shown) extending along at least a portion of the circumference (typically extending towards the a centerline of the dosage form X along a plane perpendicular therefrom) and inner surface of said shells 5,6, and said core 2 comprises one or more locking recesses 8 and/or recess(es) (not shown), and wherein at least a portion of said shells 5,6 proximal to the locking protrusion(s) 7 and/or recess(es) is elastically deformable such that each one locking protrusion(s) 7 and/or recess(es) of said shells is snapped into each one of the locking recess(es) 8 and/or protrusion(s) of said core, once inserted over a predetermined portion of the core 2 to provide a locking force between the core 2 and the shells 5,6. An advantage of this arrangement is that effective locking of the shells over the core (herein also referred to as "caplet" or "tablet") is achieved by mechanical engagement without the necessity of further adding adhesives (that may render assembly of the dosage form more complex and costly) or apply further assembly modifications such shrink-sleeve or dip-coating drying. Combinations of protrusions and recesses may be advantageously used to further improve locking force.

In an embodiment, the shells have a shell thickness of from 10 to 500 microns, preferably from 30 to 300 microns, more preferably from 50 to 200 microns, even more preferably from 75 to 150 microns, most preferably from 80 to less than 125 microns. Such has the advantage of providing the desired elasticity to effectively provide snapping of the protrusion(s) into its respective recess(es).

In an embodiment, the shells have a higher elasticity than the core. Without wishing to be bound by theory, it is believed that mechanical locking of elastic shells over a substantially less elastic core enables an effective locking force to be achieved.

In an embodiment, the locking protrusion 7 and/or the locking recess 8 is continuous, preferably in the form of a ring along the circumference of the shells 5,6 and/or core 2. An advantage of this arrangement is to enable a locking force that is substantially equally distributed along the entire circumference of the dosage form. It may also provide a better perception of tamperproofness on the touch by a user handling the dosage form prior to administration.

In an embodiment, a gap is formed between the first and second shells to expose a portion of the core. Advantageously this may enable different controlled release profiles whilst still ensuring correct and appropriate tamperproofness as well as achieving a variety of visual effects of the final assembled dosage form.

In another embodiment, the first and second shells abut each other such that no portion of the core is exposed. This embodiment may be advantageous in instances where achieving a visual impression that most closely resembles a capsule is desired.

In an embodiment, the locking protrusion 7 and/or the locking recess 8 is discontinuous, preferably in the form of one or more dimples 9 along the circumference of the shells 5,6 and/or core 2 or in the form of at least two continuous rings 10 longitudinally spaced apart along a dosage form length axis X. More preferably, the aspect ratio AR [defined as the shortest dimension (or width W) of the dimple over the longest dimension (or length L) of said dimple] is from 0.01 to 0.8, preferably from 0.05 to 0.75, more preferably from 0.1 to 0.65, most preferably from 0.2 to 0.6.

In a further embodiment, the locking protrusion 7 and/or the locking recess 8 comprise a combination of one or more dimples 9 and one or more rings 10.

In an embodiment, the shells 5,6 are hard capsule shells, preferably comprising a capsule material selected from gelatin, one or more cellulose derivatives, and mixtures thereof. Typical materials that can be suitable in shells herein are further described and exemplified in the sections that follow.

In an embodiment, an adhesive substance 11 is comprised between the first and second ends 3,4 of the core 2 and an inner surface of the first and second shells 5,6. Preferably, the adhesive substance is arranged between at least a portion of the recess in the core and the protrusion of the shell. An advantage of this arrangement is to further provide added molecular adhesion to the mechanical locking and better fixedly join the one or more protrusions into respective recess.

The adhesive substance 11 may be disposed between, typically only, the first and second ends 3,4 of the core 2 and a dome shaped closed end of the first and second shells 5,6, preferably such that a middle region of the core 2 located between the first and second ends 3,4 thereof is substantially free of said adhesive substance 11.

In an embodiment, a tamperproof dosage form 1 for oral administration is contemplated. The tamperproof dosage form 1 comprising: a caplet 2 comprising first and second ends, a middle region extending between said first and second ends, parallel and oppositely disposed top and bottom faces, and a land 13 interposed between said top and bottom faces 14, 15 and extending along a perimeter of the caplet 2 on a plane parallel to a caplet length axis (generally also referred to as the dosage form centerline X); and first and second shells, each comprising an open end 16 and a closed dome-shaped end 17, each fitted over at least a portion of said caplet 2, said portion comprising at least said first and/or second ends of the caplet 2 and at least part of said middle region; wherein an adhesive substance is arranged between said caplet 2 and said shells at least over a portion of the top and/or bottom faces proximal to the first and second ends of the caplet 2 and a corresponding portion of an inner surface of the closed dome-shaped end of said shells to fixedly join said shells to said caplet 2. An advantage of this embodiment is that, particularly in view of the adhesive substance being present on the faces of the caplet, a greater resistance to torsion as well as tensile (or pull-apart) forces is achieved that overall results in a true tamperproof dosage form, such whilst limiting the risk of shell deformation versus collocation of the adhesive material solely at the apex of the dosage form.

Preferably, the adhesive substance is disposed over an adhesive area, said adhesive area corresponding to an external surface of the caplet 2 comprising at least a portion of the top and/or bottom faces and a portion of the land proximal to the first and second ends of the caplet 2, preferably wherein said adhesive area is less than the total external surface area of the caplet 2. Generally, the adhesive area extends substantially continuously over the top and/or bottom faces and the land. Advantageously, it has been found that it is not necessary to coat the entire caplet with adhesive substance to attain true tamperproofness thanks to the particular location of the adhesive.

In an embodiment, the adhesive substance 11 is comprised in an amount of from 0.6% to 4%, preferably 0.12% to 2%, by weight of the caplet 2. An advantage of this embodiment is that appropriate tamperproofness is ensured without deformation of the shells that may arise at higher levels of adhesive or not be sufficient at lower levels thereof.

In a preferred embodiment, the adhesive region is greater than 5%, preferably from 10% to 35%, more preferably from 15% to 25%, of the total external surface area of the caplet 2. Adhesive regions less than 5% of the total caplet surface are ineffective in providing the desired tamperproofness, whilst adhesive regions of greater than 35% of the total caplet surface provide limited added tamperproofness and rather considerably add material cost and complexity of the process of making.

The adhesive substance may be radially disposed between the caplet 2 and the first and second shells such to substantially continuously extend parallel to the circumference of the respective shells. An advantage of this arrangement is added resistance to tampering by torsion.

In an embodiment, the adhesive substance may be disposed between the caplet 2 and substantially the entire inner surface of the dome-shaped end of each first and second shells.

In an embodiment, the caplet is free of one or more subcoatings such that caplet is directly in contact with the adhesive substance. By "subcoating" it is intended herein any substance that is applied over the caplet and which has dried (e.g. is no longer in liquid form) prior to insertion of the capsule shells over the ends of the caplet, such as any prior art subcoating used to coat caplets for use in providing coated dosage forms.

In an embodiment the dosage form is not banded. An advantage of this arrangement is to retain the tamperproof benefits whilst maintaining good visual acceptance by subjects of the dosage form.

In a preferred embodiment, the adhesive substance 11 is in the form of an aqueous composition preferably free of organic solvent.

Preferably, an external recess 12 is present on an external surface of the first and second shells 5,6 directly opposite and superposed to the one or more locking protrusions 7 such that the location thereof is visually discernable. An advantage is to further provide an added perception of tamperproofness.

The external recess 12 is typically sized such to provide a visual and/or tactile perception of tamperproofness preferably when handled by a target subject prior to administration, said recess 12 typically having a depth d of from 30 to 300 microns, preferably from 100 to 200 microns, more preferably from 130 to 180 microns, and/or a width w of from 0.5 to 2.5 mm, preferably from 0.5 to 1.5 mm, more preferably from 0.5 to 1.0 mm, and/or a pitch p of greater or equal to 0.15 C, preferably greater or equal to 0.25 C, more preferably from 0.25 C to C, wherein C is the circumference of the respective shell.

In an embodiment, the core 2 comprises one or more pharmaceutically active materials (or drugs) and optionally one or more excipients.

In an embodiment, the core 2 is in the form of a caplet or tablet typically elongate in shape.

In an embodiment, the outer surface of the dosage form, typically at least the outer surface of the first and second shells comprises indicia (such as a printed or colored texture, or external recesses as described above) arranged to provide a tactile or visual perception of tamperproofness, preferably wherein said indicia is in the form or one or more protrusions and/or recesses. An advantage of this embodiment is to provide an added perception of tamperproofness during handling of the dosage form.

In any of the embodiments herein, the dosage form article may comprise further indicia to, typically visually, or otherwise, indicate whether the dosage from has been tampered with. The indicia may be in the form of adhesive substances described herein being arranged such that it may be seen through the shells (for example by inclusion of one or more tribochromatic compounds in the adhesive substances herein as explained in more detail in the section that follows). Alternatively, or in addition, the shells may be translucent such that the indicia may be seen through the shell. The tribochromatic compounds for use herein above may be capable of changing color, preferably irreversibly, upon the application of shear. In these arrangements, the dosage form may be inspected before ingesting and provide a warning to the patient if the dosage form has been tampered.

The dosage form articles herein, preferably the shells thereof, may be made of, or consist of, an ingestible material comprising any material known in the art for making hard capsules such as gelatin (bovine, porcine or fish source), polymers (such as cellulose derivatives, polysaccharides, polyacrylates and the like). Preferably however, the material comprises one or more acid resistant and/or enteric materials, typically selected from the group consisting of hydroxypropyl methylcellulose (HPMC), cellulose acetate phthalate (CAP), hydroxypropyl methylcellulose acetate succinate (HPMCAS), hydroxypropyl methylcellulose phthalate (HPMCP), and mixtures thereof.

Non-limiting examples of suitable shells include the following commercially available: HPMC-based capsules (such as Vcaps® or Vcaps Plus ® capsules supplied by CAPSUGEL®), pullulan-based capsules (such as Plantcaps® capsules supplied by CAPSUGEL®), HPMC/Gellan gum-based capsules (such as DRcaps® capsules supplied by CAPSUGEL®), gelatin-based capsules (such as Coni-Snap® capsules supplied by CAPSUGEL®), and combinations thereof.

Dosage form shells herein may be non-injection molded, and preferably made via a dip molding process. The latter ensures high production speeds and cost effectiveness. Other materials may also be used, as will be recognized by one skilled in the art, including cellulose ethers, such as starches (e.g. waxy maize starch, tapioca dextrin, and derivatives thereof), carrageenan, and polymers or copolymers of (meth)acrylic acids and derivatives thereof.

Adhesive Substance

Adhesive substances (also referred to herein as adhesive compositions) for use herein are those suitable for bonding shells to a caplet to form a tamperproof dosage form for oral administration as described herein. The adhesive composition is typically an aqueous composition free of organic solvents and may comprise or consist essentially of, one or more adhesive enhancing agents and water. Typically, the adhesive substance is free of gelatin.

The adhesive substance, when used, is typically in liquid form upon insertion of the shells over the caplet and typically physically and/or chemically bonds to said shells during drying which occurs generally after the shells are fully inserted over the caplet. An advantage of this arrangement is to further result in added molecular bonding achieved by the slight melting of the shell interface at the respective inner surface directly in contact with said substance. Without wishing to be bound by theory, the melted portion of the shell will dry and re-solidify together with the adhesive substance such to provide an even more evenly distributed bonding.

The adhesive composition may comprise, preferably consist essentially of, one or more adhesive enhancing agents, water and optionally an indicia imparting compound. Such is particularly desirable when the dosage form comprises indicia for indicating whether the dosage form has been tampered with.

Water is preferably comprised at a level of from greater than 25%, typically greater than 35% or even greater than 40%, preferably from 43% to 90%, preferably from 45% to 80%, more preferably from 45% to 70%, even more preferably from 45% to 60%, by weight of said composition.

The adhesive enhancing agent may be selected from the group consisting of one or more of chitosan, sugars such as sucrose, fructose, lactose, maltose, cellobiose, glucose, galactose, mannose, arabinose, sorbitol, and mixtures thereof, potato and/or corn starch, aspartame, glycosides such as steviol, synthetic homopolymers of N-vinyl-2pyrrolidone; gelatin (bovine and/or porc); monofunctional organic acid such as fatty acids, acetic acid, benzoic acid, propanoic acid, and mixtures thereof; polyfuntional organic acids such as citric acid, glycolic acid, lactic acid, mailic acid, tartaric acid, mandelic acid, fumaric acid, phosphoric acid and mixtures thereof; and mixtures thereof. Preferably the adhesive enhancing agent is selected from the group consisting of sucrose, fructose, lactose, maltose, cellobiose, glucose, galactose, mannose, arabinose, sorbitol, and mixtures thereof. Further details about suitable adhesives are provided in the following sections.

In an embodiment, the adhesive enhancing agent consists essentially of one or more sugars, and one or more monofunctional or polyfuntional organic acids.

Typically, the adhesive enhancing agent is comprised at a level of from 10% to 76%, preferably from greater than 10% to 75%, preferably from 15% to 70%, more preferably from 20% to 60%, more preferably from 30% to 55%, even more preferably from 40% to 55%, by weight of the composition.

In an embodiment, the ratio of the one or more adhesive enhancing agents to water is from 0.10 to 1.30, more preferably from 0.20 to 1.00, even more preferably from 0.30 to 0.90, even more preferably from 0.60 to 0.80. Surprisingly, such ratios ensure good adhesion not only when gelatin is used as material for the dosage form shells but also when other polymer based materials are used, such as polysaccharides and celluloses as described above.

In an embodiment, the adhesive composition comprises a mixture of one or more adhesive enhancing agents, one or more film-forming agents, and one or more gliding agents. In such embodiments, the adhesive composition is preferably in liquid form during insertion of the shells over the caplet. Moreover, said composition may be further diluted with water to achieve the desired low viscosities described herein.

Film-forming agents may be selected from the group consisting of cellulosephthalateacetate, microcrystalline cellulose, methylcellulose, hydroxypropyl methylcellulose, alginates, gum arabic, carboxymethylcellulose, hydroxyethylcellulose, methylcellulose, and mixtures thereof; preferably selected from methylcellulose, hydroxypropyl methylcellulose, gum arabic, carboxymethylcellulose, hydroxyethylcellulose methylcellulose and mixtures thereof; more preferable hydroxypropyl methylcellulose.

Gliding agents may be selected from the group consisting of polyethylene glycol, polypropylene glycol, triethyl citrate, mono-, di- or triacetates of glycerol and 1,2-propyleneglycol, and mixtures thereof, preferably polypropylene glycol.

The composition may comprise a film forming agent in an amount of from 0 to about 85%, preferably from 0 to about 80%, more preferably from 0 to about 40%, even more preferably from about 5% to about 30%, most preferably from about 10% to about 25%, by weight, an adhesion enhancing agent in an amount of from about 10 to about 90%, preferably from about 35 to about 80%, more preferably from about 40 to about 70%, most preferably from about 50 to less than about 70%, by weight, and a glidant in an amount of from about 5 to about 50%, preferably about 10 to about 25, most preferably about 15 to about 20%, by weight, based on the weight of the composition.

In an embodiment, the composition may be diluted in water such to achieve the desired viscosity. The water may be contained in said composition in amounts of from 20% to 80%, preferably from 30% to 70%, more preferably from 35% to 65%, most preferably from 40% to 60%, by weight of said composition.

The adhesive composition is preferably a low viscosity and/or non-pasty adhesive composition, preferably having a viscosity of from 0.5 mPa·s to 1300 mPa·s, preferably from 0.7 mPa·s to 1200 mPa·s, more preferably from 0.9 mPa·s to 1100 mPa·s or even from 1 mPa·s to 1000 mPa·s. The viscosity generally being measured at room temperature (about 22.5° C.) with a Brookfield type LVDV II+, spindle 21, at 100 RPM.

The indicia imparting compound may be selected from one or more optional tribochromatic (i.e. tribochromic) compounds, coloring agent(s), and mixtures thereof.

Tribochromic compounds are colored compounds that have the property of changing color when subjected to mechanical stress, such as shear. When this compound is impregnated or applied onto a support, the color of the support will undergo a color change at the time of the mechanical stress/shear. Typical forces to be applied in order to obtain the desired tribochromic effect range from 0.01 N to 50 N, for instance from 0.1 N to 20 N, such as from 1 N to 20N. This color change is irreversible. Once the conformation of the molecule has been modified, the latter cannot return to its initial conformation.

The color shade obtained depends on the force and the time of the mechanical stress exerted on the material. The longer and/or greater the mechanical stress, the greater the amount of tribochromic compounds whose conformation will have changed and the greater the modification of the color or the shade.

Suitable tribochromic compounds for use herein are described in paragraph 0028 to 0035 of US2006/0286049A1.

The one or more tribochromic compounds may be used alone or in combination with other colorants or pigments to provide different visual effects.

Suitable coloring agents for use herein include pharmaceutically acceptable coloring agents, food acceptable colorants, or mixtures thereof. Examples of such colorants include, but are not limited to, azo-, quinophthalone-, triphenylmethane-, xanthene- or indigoid dyes; iron oxides or hydroxides; titanium dioxide; natural dyes; and mixtures thereof. Additional examples include patent blue V, acid brilliant green BS, red 2G, azorubine, ponceau 4R, amaranth, D+C red 33, D+C red 22, D+C red 26, D+C red 28, D+C yellow 10, yellow 2 G, FD+C yellow 5, FD+C yellow 6, FD+C red 3, FD+C red 40, FD+C blue 1, FD+C blue 2, FD+C green 3, brilliant black BN, carbon black, iron oxide black, iron oxide red, iron oxide yellow, titanium dioxide, riboflavin, carotenes, anthocyanines, turmeric, cochineal extract, chlorophyllin, canthaxanthin, caramel, betanin and Candurin® pearlescent pigments. Candurin ® is manufactured and marketed by Merck KGaA, Darmstadt, Germany and consists of titanium dioxide and/or iron oxide (approved food and pharmaceutical colorants in many countries) and potassium aluminum silicate as a color carrier.

The indicia imparting compound may be comprised at a level of from 0% to 5%, preferably from greater than 0% to 3%, more preferably from greater than 0% to 2%, by weight of the adhesive composition.

Drug/Medicament

Dosage form articles described herein may comprise one or more drugs. Drugs suitable for use in the dosage forms described herein may take any form and be for any treatment of a human or animal subject. This includes not only pharmaceutical compounds but also dietary supplements such as vitamins, minerals and the like.

The drug may be in a state selected from solid, at room temperature and atmospheric pressure, and comprises one or more active compounds, typically in the form of a tablet (also referred to as caplet) as described herein.

Suitable compounds for delivery according to the disclosure include, but are not limited to, powder, liquid, and/or pellet forms of the following:

a) pharmaceuticals (also called pharmaceutical actives) such as betamethasone, thioctic acid, sotalol, salbutamol, norfenefrine, silymahn, dihydroergotamine, buflomedil, etofibrate, indomethacin, oxazepam, acetyldigitoxins, piroxicam, halopehdol, isosorbide mononitrate, amithptyline, diclofenac, nifedipine, verapamil, pyritinol, nitrendipine, doxycycline, bromhexine, methylprednisolone, clonidine, fenofibrate, allopurinol, pirenzepine, levothyroxine, tamoxifen, metildigoxin, o-(B-hydroxyethyl)-rutoside, propicillin, aciclovirmononitrate, paracetamolol, naftidrofuryl, pentoxifylline, propafenone, acebutolol, 1-thyroxin, tramadol, bromocriptine, loperamide, ketofinen, fenoterol, ca-dobesilate, propranolol, minocycline, nicergoline, ambroxol, metoprolol, B-sitosterin, enalaprilhydrogenmaleate, bezafibrate, isosorbide dinitrate, gallopamil, xantinolnicotinate, digitoxin, flunitrazepam, bencyclane, depanthenol, pindolol, lorazepam, diltiazem, piracetam, phenoxymethylpenicillin, furosemide, bromazepam, flunarizine, erythromycin, metoclopramide, acemetacin, ranitidine, biperiden, metamizol, doxepin, dipotassiumchlorazepat, tetrazepam, estramustinephosphate, terbutaline, captopril, maprotiline, prazosin, atenolol, glibenclamid, cefaclor, etilefrin, cimetidine, theophylline, hydromorphone, ibuprofen, primidone, clobazam, oxaceprol, medroxyprogesterone, flecainide, Mg-pyhdoxal-5-phosphateglutaminate, hymechromone, etofyllineclofibrate, vincamine, cinnarizine, diazepam, ketoprofen, flupentixol, molsidomine, glibornuhde, dimethindene, melperone, soquinolol, dihydrocodeine, clomethiazole, clemastine, glisoxepid, kallidino-genase, oxyfedhne, baclofen, carboxymethylcystsin, thioredoxin, betahistine, 1-tryptophan, myrtol, bromelain, prenylamine, salazosulfapyridine, astemizole, sulpiride, benzerazid, dibenzepin, acetylsalicylic acid, miconazole, nystatin, ketoconazole, sodium picosulfate, colestyramate, gemfibrozil, rifampin, fluocortolone, mexiletine, amoxicillin, terfenadine, mucopolysaccharidpolysulfuric acid, triazolam, mianserin, tiaprofensaure, ameziniummethylsulfate, mefloquine, probucol, quinidine, carbamazepine, Mg-1-aspartate, penbutolol, piretanide, amitriptyline, caproteron, sodium valproinate, mebeverine, bisacodyl, 5-amino-salicyclic acid, dihydralazine, magaldrate, phenprocoumon, amantadine, naproxen, carteolol, famotidine, methyldopa, auranofine, estriol, nadolol, levomepromazine, doxorubicin, medofenoxat, azathioprine, flutamide, norfloxacin, fendiline, prajmaliumbitartrate, aescin acromycin, anipamil, benzocaine, [beta]-carotene, cloramphenicol, chlorodiazepoxid, chlormadinoneacetate, chlorothiazide, cin-narizine, clonazepam, codeine, dexamethasone, dicumarol, digoxin, drotaverine, grami-cidine, griseofulvin, hexobarbital hydrochlorothiazide, hydrocortisone, hydroflumethiazide, ketoprofen, lonetil, medazepam, mefruside, methandrostenolone, sulfaperine, nalidixic acid, nitrazepam, nitrofurantoin, estradiol, papaverine, phenacetin, phenobarbi-tal, phenylbutazone, phenytoin, prednisone, reserpine, spironolactine, streptomycin, sul-famethizole, sulfamethazine, sulfamethoxazole, sulfamethoxydiazinon, sulfathiazole, sulfisoxazole, testosterone, tolazamide, tolbutamide, trimethoprim, tyrothricin, antacids, reflux suppressants, antiflatulents, antidopaminergics, proton pump inhibitors, H2-receptor antagonists, cytoprotectants, prostaglandin analogues, laxatives, antispasmodics, antidiarrhoeals, bile acid sequestrants, opioids, beta-receptor blockers, calcium channel blockers, diuretics, cardiac glycosides, antiarrhythmics, nitrates, antianginals, vasoconstrictors, vasodilators, ACE inhibitors, angiotensin receptor blockers, alpha blockers, anticoagulants, heparin, antiplatelet drugs, fibrinolytic, anti-hemophilic factor, haemostatic drugs, hypolipidaemic agents, statins, hypnotics, anaesthetics, antipsychotics, antidepressants (including tricyclic antidepressants, monoamine oxidase inhibitors, lithium salts, selective serotonin reuptake inhibitors), antiemetics, anticonvulsants, an-tiepileptics, anxiolytics, barbiturates, movement disorder drugs, stimulants (including amphetamines), benzodiazepine, cyclopyrrolone, dopamine antagonists, antihistamines, cholinergics, anticholinergics, emetics, cannabinoids, 5-HT antagonists, analgesics, muscle relaxants, antibiotics, sulfa drugs, aminoglycosides, fluoroquinolones, bronchodilators, NSAIDs, anti-allergy drugs, antitussives, mucolytics, decongestants, corticosteroids, beta-receptor antagonists, anticholinergics, steroids, androgens, antian-drogens, gonadotropin, corticosteroids, growth hormones, insulin, antidiabetic drugs (including sulfonylurea, biguanide/metformin, and thiazolidinedione), thyroid hormones, antithyroid drugs, calcitonin, diphosponate, vasopressin analogs, contraceptives, follicle stimulating hormone, luteinising hormone, gonadotropin release inhibitor, progestogen, dopamine agonists, oestrogen, prostaglandin, gonadorelin, clomiphene, tamoxifen, di-ethylsti I bestrol, antimalarials, anthelmintics, amoebicides, antivirals, antiprotozoals, vaccines, immunoglobulin, immunosuppressants, interferon, monoclonal antibodies, and mixtures thereof;

b) vitamins, e.g., fat-soluble vitamins such as vitamins A, D, E, and K, and water soluble vitamins such as vitamin C, biotin, folate, niacin, pantothenic acid, riboflavin, thiamin, vitamin B6, vitamin B12, and mixtures thereof;

c) minerals, such as calcium, chromium, copper, fluoride, iodine, iron, magnesium, manganese, molybdenum, phosphorus, potassium, selenium, sodium (including sodium chloride), zinc, and mixtures thereof;

d) dietary supplements such as herbs or other botanicals, amino acids, and substances such as enzymes, organ tissues, glandulars, and metabolites, as well as concentrates, metabolites, constituents, extracts of dietary ingredients, and mixtures thereof;

e) homoeopathic ingredients such as those listed in the Homeopathic Pharmacopoeia of the United States Revision Service (HPRS), and mixtures thereof. It must be recognized, of course, that the HPRS is periodically updated and that the present invention includes homeopathic ingredients that may be added to the HPRS; and mixtures in any combination of the foregoing.

Process of Making

The process of making tamperproof dosage forms herein may comprise the steps of:

providing a first and second shell typically each comprising an open end and a closed dome-shaped end; providing a core having first and second ends; inserting the first shell over the first end of the core until the protrusion of the shell engages with the respective recess of the core; and inserting the second shell over the second end of the core until the protrusion of the shell engages with the respective recess of the core.

In an embodiment, the process further comprises the step of applying an adhesive on an inner surface of the closed dome-shaped end of the first shell and on an outer surface of the second end of the core, and/or an inner surface of the closed dome-shaped end of the second shell, prior to insertion of respective first and second shells over the first and second ends of the core respectively.

Preferably, the adhesive is in liquid form and remains in liquid form during the shell insertion.

In an embodiment, the adhesive is applied on said second shell whilst being held in a first orientation and the insertion of said second shell over the caplet occurring in a second orientation, wherein the angle between said first and second orientations is at least 90°, preferably from 90° to 180°, preferably wherein said first orientation comprises said shell being arranged such that the centerline of said shell is parallel to an axis of gravity and said inner surface of said closed dome-shaped end holds said adhesive against the direction of force of gravity. Such arrangement has the advantage of ensuring accurate placement of the adhesive prior to insertion over the caplet.

In an embodiment, the adhesive substance is applied radially over the inner surface of said closed dome-shaped end and/or the second end of the caplet 2 such that during respective insertion steps the adhesive substance is distributed over at least portion(s) of the top and/or bottom faces, preferably in the form of one or more droplets, typically as a spray. This has been found effective for appropriately locating the adhesive substance in the desired region of the dosage form.

In an embodiment, the adhesive substance is applied in the form of one or more droplets, having a diameter of from 0.1 mm to 1 mm, preferably from 0.2 mm to 0.8 mm, more preferably from 0.3 mm to 0.7 mm, more preferably from 0.4 mm to 0.7 mm.

In an embodiment the amount of adhesive substance, typically applied, is of from 0.1 mg to 15 mg, preferably from 1 mg to 10 mg, preferably from 2 mg to 9 mg, preferably from 3 mg to 8 mg, preferably from 4 mg to 7 mg, preferably from 5 mg to 6 mg. The amounts being for each shell, i.e. for two shells the above amounts being multiplied by a factor of two.

In an embodiment, the adhesive substance is applied as a spray (i.e. a plurality of droplets), preferably the spray being a conical spray (i.e. radiating outward/inward in the form of a cone). In this embodiment the spray is applied on the inner surface of the shell (and/or caplet). In this embodiment, the droplets typically have a diameter of from 10 μm to 500 μm, preferably from 10 μm to 300 μm, more preferably from 20 μm to 250 μm, even more preferably from 30 μm to 150 μm, most preferably from 40 μm to 100 μm.

In an embodiment, the process may comprise the step of providing an impacting (and/or tapping) step wherein the assembled dosage form or at least the first and/or second shells (after respective insertion steps) are tapped and/or impacted such to further distribute the adhesive substance between the caplet and the shells. Such tapping and/or impact may be provided by any suitable means arranged to tumble, drop, tap and the like, said dosage forms. Non-limiting examples include: tumbling of the assembled dosage forms in a rotating drum; vibration of the assembled dosage forms over a vibrating bed; dropping of the assembled dosage forms under the effect of gravity, such as from a transfer line at a first height to a reservoir or second transfer line at a second height thereunder; tapping, by means of an actuated tapper, the shells of the dosage form after insertion over the caplet; and combinations thereof.

In an embodiment, a shrinkage drying step is applied once the dosage form is in its fully assembled state, generally said step comprising reducing the moisture in the shell such to cause shrinkage thereof.

EXAMPLES AND METHODS

Figure 5:
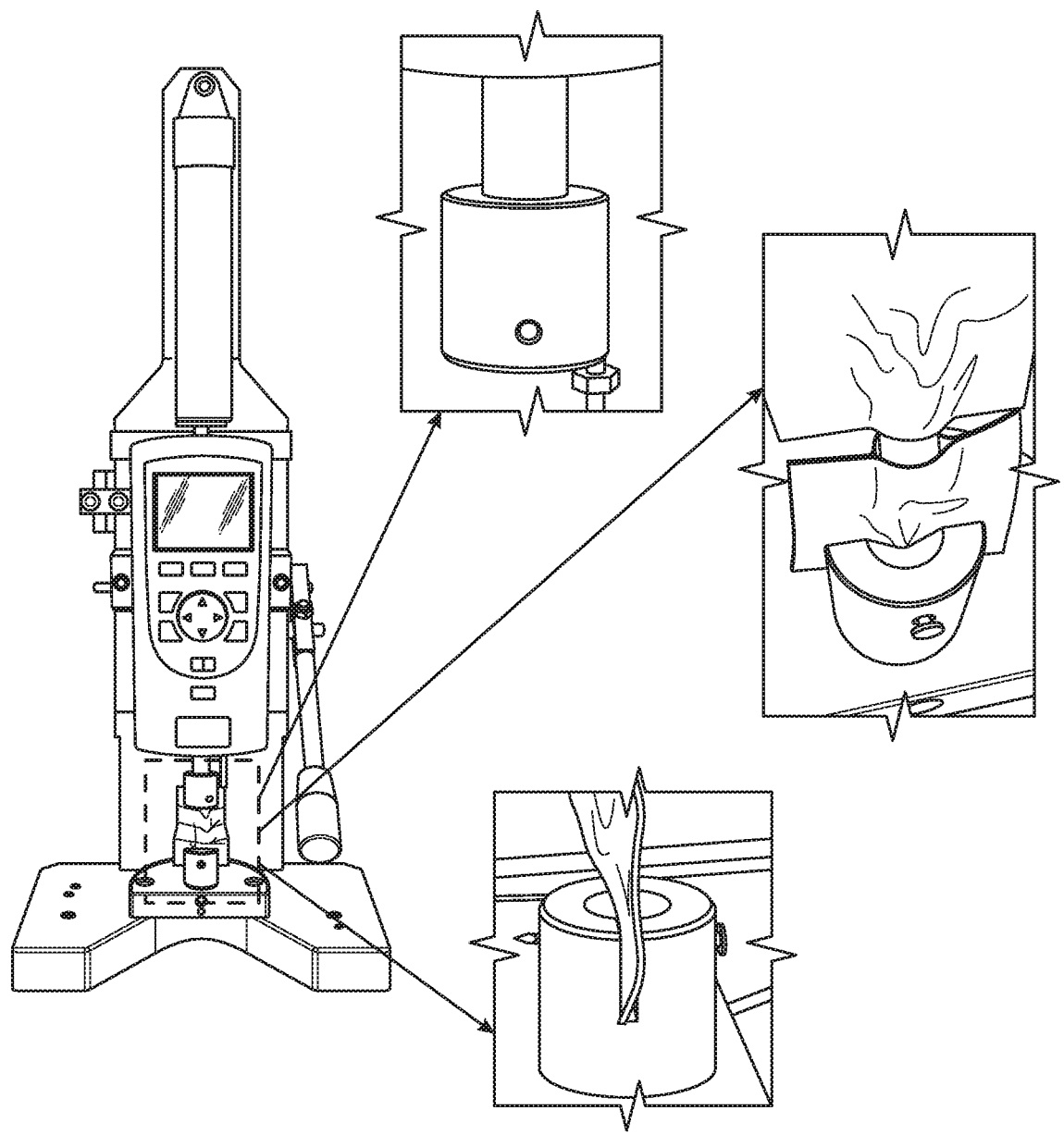
FIG. 5 is an image illustrating the set-up used to measure the pull-apart forces herein described.

Pull-Apart Test:

Pull-apart or opening forces as measured by Chatillon DFE II Series Digital Force Gauges from Ametek Inc. The test fixtures of the universal testing machine are modified to fixate the specimens without applying pressure force on them. Duct tape [3M 398FR] is first fixated separately around both shells. The outer end of the duct tape is then inserted in gauge of the test fixtures and is fixated by pressing a nail through the opening of the fixtures and tape. After correct positioning of the specimen, the peak (or ultimate) tensile strength is measured in Newtons (N). The setup is shown in FIG. 5.

Figure 6:
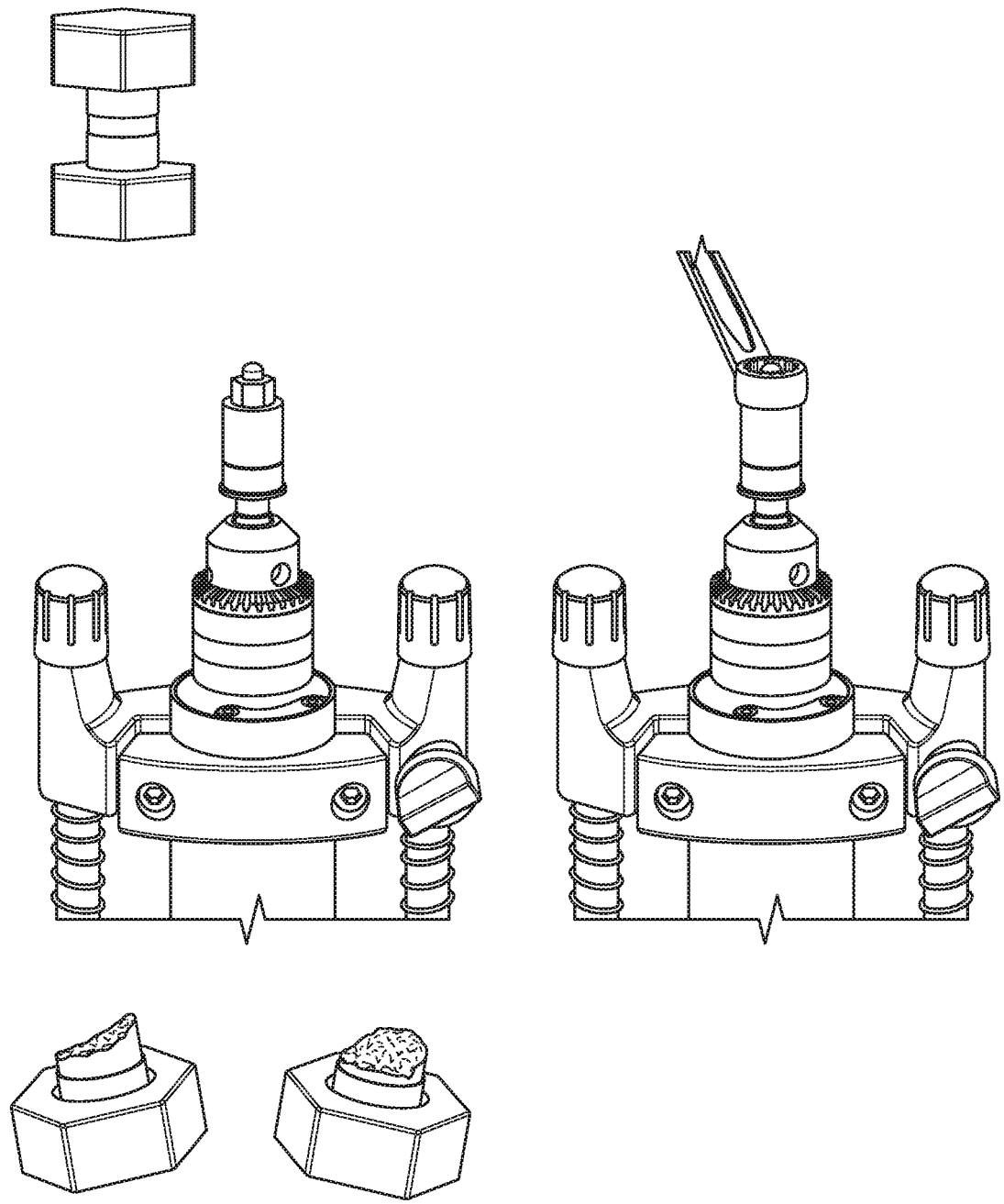
FIG. 6 is an image illustrating the set-up used to measure torsion herein described.

Torsion Test:

Torque measurements as measured by Chatillon® DFS II Series Digital force gauges with a chatillon® STS series torque sensor (TSD-50 OZ-IN) from Ametek Inc. Hex screw nuts of polyamide with minimal clearance are fixated (with cyanoacrylate glue) around (outside surface) of first and second shells. The first shell with screw nut is placed into a socket mounted on the torsion gauge. A hex screw key is then used to screw the second shell from the caplet and the torsion force recorded. The setup is shown in FIG. 6.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" (i.e. every value in a practical range close to 40 mm).

The invention claimed is:

1. A tamperproof dosage form article comprising:
    a single core, wherein said core comprises a first end and a second end;
    a first shell having an open end and a closed dome-shaped end, the first shell on at least a portion of the first end of the core;
    a second shell having an open end and a closed dome-shaped end, the second shell on at least a portion of the second end of the core;
    wherein the first and second shells comprise one or more locking protrusion(s) extending along the full circumference and inner surface of said shells, and said core comprises one or more locking recess(es) formed into the core, and wherein at least a portion of said shells proximal to the locking protrusion(s) is elastically deformable and arranged such that each one locking protrusion of said shells is snapped into each one of the locking recess(es) of the core, once inserted over a predetermined portion of the core to provide a locking force between the core and the shells such that the dosage form is tamperproof;
    wherein an amount of force required to overcome the locking force to separate the first and/or second shell from the core once inserted over the core, is greater than or equal to a fracture strength of the core and/or first and/or second shell.

2. A tamperproof dosage form according to claim 1 wherein the locking recess is continuous.

3. A tamperproof dosage form according to claim 1 wherein the locking recess is discontinuous.

4. A tamperproof dosage form according to claim 1 wherein the locking protrusion and the locking recess have an aspect ratio of from 0.1 to 0.65.

5. A tamperproof dosage form according to claim 1 wherein the shells are hard capsule shells comprising gelatin, one or more cellulose derivatives, pullulan, or mixtures thereof.

6. A tamperproof dosage form according to claim 1 further comprising an adhesive substance between the first and second ends of the core and an inner surface of the first and second shells between at least a portion of top and bottom surfaces and respective inner surfaces of said first and second shells.

7. A tamperproof dosage form according to claim 6 wherein the adhesive substance is disposed between the first and second ends of the core and a dome shaped closed end of the first and second shells.

8. A tamperproof dosage form according to claim 6 wherein the adhesive substance comprises one or more adhesive enhancing agents comprising a polysaccharide, a monofunctional organic acid, a polyfuntional organic acid, or mixtures thereof.

9. A tamperproof dosage form according to claim 6 wherein the adhesive substance comprises a sucrose, fructose, lactose, maltose, cellobiose, glucose, galactose, mannose, arabinose, sorbitol, or mixtures thereof.

10. A tamperproof dosage form according to claim 6 wherein the adhesive substance is in the form of an aqueous composition substantially free of organic solvent.

11. A tamperproof dosage form according to claim 1 wherein an external recess and/or protrusion is present on an external surface of the first and second shells generally directly opposite and superposed to the one or more locking protrusions such that the location thereof is visually discernable.

12. A tamperproof dosage form according to claim 11 wherein the external recess and/or protrusion is sized such to provide a visual and/or tactile perception of tamperproofness when handled by a target subject prior to administration, said recess having a depth (d) of from 30 to 300 microns and/or a width (w) of from 0.5 to 2.5 mm and/or a pitch (p) of greater than or equal to 0.15 C, wherein C is the circumference of the respective shell.

13. A tamperproof dosage form according to claim 1 wherein the core comprises one or more pharmaceutically active materials and one or more excipients.

14. A tamperproof dosage form according to claim 1 wherein the core is in the form of a caplet or tablet.

15. The tamperproof dosage form of claim 2 wherein the locking protrusion and/or the locking recess is continuous, in the form of a ring along the circumference of the shells and/or core.

16. The tamperproof dosage form of claim 2 further comprising a gap formed between the first and second shells, exposing a portion of the core.

17. The tamperproof dosage form of claim 3 wherein the locking protrusion and/or the locking recess is in the form of at least two continuous rings longitudinally spaced apart along a dosage form length axis (X).

18. The tamperproof dosage form of claim 6 wherein the adhesive substance is disposed between the first and second ends of the core and a dome shaped closed end of the first and second shells such that a middle region of the core located between the first and second ends thereof is substantially free of the adhesive substance.

19. A tamperproof dosage form article comprising:
    one core, wherein said core comprises a first end and a second end;
    a first shell having an open end and a closed dome-shaped end, the first shell on at least a portion of the first end of the core;
    a second shell having an open end and a closed dome-shaped end, the second shell on at east a portion of the second end of the core;
    wherein the first and second shells comprise two v-shaped locking protrusion(s) extending discontinuously along the circumference and inner surface of said shells, and said core comprises two v-shaped locking recess(es) extending continuously or discontinuously along the full circumference of the core, and wherein at least a portion of said shells proximal to the locking protrusion(s) is elastically deformable and arranged such that each of the locking protrusions of said shells is snapped into the locking recess(es) of the core, once inserted over a predetermined portion of the core to provide a locking force between the core and the shells such that the dosage form is tamperproof.

20. A tamperproof dosage form article comprising:
    a core, wherein said core comprises a first end and a second end;

a first shell having an open end and a closed dome-shaped end, the first shell on at least a portion of the first end of the core;

a second shell having an open end and a closed dome-shaped end, the second shell on at least a portion of the second end of the core;

wherein the first and second shells comprise one or more locking protrusion(s) extending along at least a portion of the circumference and inner surface of said shells, and said core comprises one or more locking recess(es), and wherein at least a portion of said shells proximal to the locking protrusion(s) is elastically deformable and arranged such that each one locking protrusion of said shells is snapped into each one of the locking recess(es) of the core, once inserted over a predetermined portion of the core to provide a locking force between the core and the shells, such that an amount of force required to overcome the locking force to separate the first and/or second shell from the core once inserted over the core, is greater than or equal to a fracture strength of the core and/or first and/or second shell;

an adhesive substance between the first and second ends of the core and an inner surface of the first and second shells between at least a portion of top and bottom surfaces and respective inner surfaces of the first and second shells; and a gap formed between the first and second shells, exposing a portion of the core.

\* \* \* \* \*

UNITED STATES PATENT AND TRADEMARK OFFICE
CERTIFICATE OF CORRECTION

PATENT NO. : 10,709,640 B2  
APPLICATION NO. : 15/769381  
DATED : July 14, 2020  
INVENTOR(S) : Huysmans et al.

Page 1 of 1

It is certified that error appears in the above-identified patent and that said Letters Patent is hereby corrected as shown below:

In the Claims

Column 14, Line 51, Claim 19 delete "at east a portion" and insert --at least a portion--.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*